United States Patent
Zhang et al.

(10) Patent No.: US 12,224,871 B2
(45) Date of Patent: Feb. 11, 2025

(54) METHODS AND APPARATUSES FOR TRANSMITTING AND RECEIVING SIDELINK INFORMATION

(71) Applicant: FUJITSU LIMITED, Kawasaki (JP)

(72) Inventors: Jian Zhang, Beijing (CN); Pengyu Ji, Beijing (CN); Guorong Li, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 17/217,051

(22) Filed: Mar. 30, 2021

(65) Prior Publication Data
US 2021/0218511 A1    Jul. 15, 2021

Related U.S. Application Data

(63) Continuation of application No. PCT/CN2018/113810, filed on Nov. 2, 2018.

(51) Int. Cl.
*H04L 1/18* (2023.01)
*H04L 1/1812* (2023.01)
(Continued)

(52) U.S. Cl.
CPC .......... *H04L 1/1887* (2013.01); *H04L 1/1819* (2013.01); *H04L 1/1896* (2013.01);
(Continued)

(58) Field of Classification Search
None
See application file for complete search history.

(56) References Cited

U.S. PATENT DOCUMENTS

| 2015/0023267 A1* | 1/2015 | Lim | H04L 1/1854 |
| | | | 370/329 |
| 2015/0173048 A1* | 6/2015 | Seo | H04W 52/383 |
| | | | 370/329 |

(Continued)

FOREIGN PATENT DOCUMENTS

| CN | 105409297 A | 3/2016 |
| CN | 105594263 A | 5/2016 |

(Continued)

OTHER PUBLICATIONS

Communication pursuant to Rule 164(1) EPC, with partial supplementary European search report issued by the European Patent Office for corresponding European Patent Application No. 18938549.5-1205, dated Oct. 14, 2021.

(Continued)

*Primary Examiner* — Steve R Young
(74) *Attorney, Agent, or Firm* — Myers Wolin, LLC

(57) ABSTRACT

Methods and apparatuses for transmitting and receiving sidelink information. The method includes: determining a priority/priorities of second data information and/or feedback information by a second device, allocating power for the second data information and/or the feedback information according to the priority/priorities; and/or scrambling and/or indicating the second data information and/or the feedback information by the second device by using an identifier. Hence, supporting multiple unicast sessions or groupcast sessions by the same device may be achieved.

4 Claims, 10 Drawing Sheets

(51) Int. Cl.
    *H04L 1/1867*    (2023.01)
    *H04W 72/02*    (2009.01)
    *H04W 72/04*    (2023.01)
    *H04W 72/044*    (2023.01)
    *H04W 92/18*    (2009.01)

(52) U.S. Cl.
    CPC ....... *H04W 72/02* (2013.01); *H04W 72/0466* (2013.01); *H04W 92/18* (2013.01)

(56) References Cited

U.S. PATENT DOCUMENTS

| | | |
|---|---|---|
| 2016/0157184 A1 | 6/2016 | Wang et al. |
| 2016/0234788 A1 | 8/2016 | Noh et al. |
| 2016/0323129 A1* | 11/2016 | Wang .................... H04W 76/11 |
| 2017/0215183 A1 | 7/2017 | Gulati et al. |
| 2017/0347394 A1 | 11/2017 | Yasukawa et al. |
| 2018/0027522 A1* | 1/2018 | Lee ....................... H04W 72/21 |
| | | 370/336 |
| 2018/0049219 A1 | 2/2018 | Gupta et al. |
| 2018/0076942 A1 | 3/2018 | Nory et al. |
| 2018/0175969 A1* | 6/2018 | Guan .................... H04L 1/1864 |
| 2018/0262302 A1 | 9/2018 | Bergström et al. |
| 2019/0110325 A1* | 4/2019 | Gulati ................... H04L 5/0082 |
| 2019/0132104 A1 | 5/2019 | Lee et al. |
| 2019/0268904 A1* | 8/2019 | Miao ..................... H04W 52/02 |
| 2019/0394786 A1* | 12/2019 | Parron .................... H04W 4/46 |
| 2020/0037314 A1* | 1/2020 | Xiong ................... H04W 72/21 |
| 2020/0053770 A1* | 2/2020 | Gulati ................. H04W 74/002 |
| 2020/0162201 A1 | 5/2020 | Zhou |
| 2020/0404684 A1 | 12/2020 | Lee et al. |
| 2021/0029688 A1* | 1/2021 | Zhang ................... H04L 5/0044 |
| 2021/0153146 A1* | 5/2021 | Liu ....................... H04L 5/0048 |
| 2021/0167926 A1* | 6/2021 | Lin ....................... H04L 5/0007 |
| 2021/0219320 A1* | 7/2021 | Belleschi .............. H04W 72/20 |
| 2021/0235421 A1* | 7/2021 | Xing ..................... H04L 1/1819 |

FOREIGN PATENT DOCUMENTS

| | | |
|---|---|---|
| CN | 105634689 A | 6/2016 |
| CN | 107949998 A | 4/2018 |
| CN | 107995605 A | 5/2018 |
| CN | 108400843 A | 8/2018 |
| CN | 108401480 A | 8/2018 |
| EP | 2 530 896 A2 | 12/2012 |
| JP | 2020-529801 A | 10/2020 |
| WO | 2016/076301 A1 | 5/2016 |
| WO | 2017/171528 A1 | 10/2017 |
| WO | 2017/192009 A1 | 11/2017 |
| WO | 2018/169327 A1 | 9/2018 |
| WO | 2018/175553 A1 | 9/2018 |
| WO | 2018/183101 A1 | 10/2018 |
| WO | 2019/029652 A1 | 2/2019 |

OTHER PUBLICATIONS

International Search Report and Written Opinion of the International Searching Authority issued by the National Intellectual Property Administration of the P.R. China, for corresponding International Patent Application No. PCT/CN2018/113810, mailed on Jul. 26, 2019, with an English translation.

QUALCOMM Incorporated, "Procedures and use cases for groupcast and unicast transmissions", Agenda Item: 7.2.4.1.1, 3GPP TSG-RAN WG1 Meeting #94bis, R1-1811260, Chengdu, China, Oct. 8-12, 2018.

Notice of Reasons for Refusal issued by the Japan Patent Office for corresponding Japanese Patent Application No. 2021-518162, mailed on May 31, 2022, with an English translation.

First Notification of Office Action and Search Report issued by the China National Intellectual Property Administration for corresponding Chinese Patent Application No. 201880097880.5, dated May 25, 2023, with an English translation.

Second Notification of Office Action and Search Report issued by the China National Intellectual Property Administration for corresponding Chinese Patent Application No. 201880097880.5, mailed on Nov. 7, 2023, with an English translation.

The partial European search report issued by the European Patent Office for corresponding European Patent Application No. 22151741.0-1213, mailed on Apr. 7, 2022.

Notice of Reasons for Refusal issued by the Japan Patent Office for corresponding Japanese Patent Application No. 2022-122654, mailed on Sep. 12, 2023, with an English translation.

Mediatek Inc. "Physical layer structure for NR sidelink", Agenda Item: 7.2.4.1.2, 3GPP TSG-RAN WG1 Meeting #94bis, R1-1810453, Chengdu, China, Oct. 8-12, 2018.

Communication pursuant to Article 94(3) EPC issued by the European Patent Office for corresponding European Patent Application No. 18 938 549.5-1213, mailed on Sep. 13, 2023.

Communication pursuant to Article 94(3) EPC issued by the European Patent Office for corresponding European Patent Application No. 18938549.5, mailed on Dec. 12, 2024.

\* cited by examiner

METHODS AND APPARATUSES FOR TRANSMITTING AND RECEIVING SIDELINK INFORMATION

CROSS-REFERENCE TO RELATED APPLICATION

This application is a continuation application of International Application PCT/CN2018/113810 filed on Nov. 2, 2018 and designated the U.S., the entire contents of which are incorporated herein by reference.

TECHNICAL FIELD

This disclosure relates to the field of communication technologies, and in particular to methods and apparatuses for transmitting and receiving sidelink information.

BACKGROUND

Vehicle to Everything (V2X) of Long Term Evolution (LTE) is a vehicle communication technology that may realize information exchange between vehicles and vehicles, vehicles and roadside equipment, and vehicles and pedestrians.

A first device in LTE V2X may directly communicate with a second device via a sidelink (SL). The sidelink is a newly defined air interface for LTE V2X (i.e. an air interface between V2X devices), which corresponds to the usual cellular network Uu interface (i.e. an air interface between a network device and a terminal equipment). The sidelink may use frequency resources of the cellular network Uu interface, or may use dedicated frequency resources.

LTE V2X only supports broadcast services. For example, the first device may broadcast road safety information to all surrounding second devices. In sidelink transmission, the first device may transmit control information via a physical sidelink control channel (PSCCH), and transmit data information via a physical sidelink shared channel (PSSCH); and the second device may perform blind detection on a sidelink control information (SCI) format (such as an SCI format 1), the SCI being used to indicate scheduled data information and being carried by the PSCCH. In view of the limited role of feedback information (such as HARQ-ACK and/or CSI) for broadcast services, LTE V2X provides no support for feedback/reporting of hybrid automatic repeat request acknowledgement (HARQ-ACK) (including ACK/NACK) and channel state information (CSI).

On the other hand, New Radio (NR) V2X is currently one of the research projects for Rel-16 standardization. Compared with LTE V2X, NR V2X needs to support many new scenarios and new services (such as remote driving, autonomous driving, and fleet driving, etc.), and it needs to meet higher technical indices (such as high reliability, low latency, and high data rate, etc.).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in order to meet demands of different scenarios and different services, in addition to broadcast services, NR V2X also needs to provide support for unicast services and groupcast services. The unicast mode is more suitable for scenarios and services that have higher requirements on data rates; for example, two vehicle devices may exchange road condition information and/or video information in the unicast mode. Unlike broadcast services, HARQ-ACK and/or CSI feedback and reporting are of great significance for unicast services and/or groupcast services.

For example, a first device may decide whether to schedule retransmission based on an HARQ-ACK feedback result, so as to avoid resource waste caused by blind retransmission; or, the first device may perform link adaptation based on CSI measurement and reporting results; for example, the first device may select modulation and coding schemes (MCSs), precoding matrix indicators (PMIs), beams, and ranks, etc., which are most adapted to a current channel, thereby facilitating realization of high data rate transmission.

However, LTE V2X only supports broadcast services. In view of the limited role of HARQ-ACK and/or CSI feedback and reporting on broadcast services, LTE V2X provides no support for HARQ-ACK and/or CSI feedback and reporting. In contrast, NR V2X needs additional support for unicast services and groupcast services, and HARQ-ACK and/or CSI feedback is/are of greater significance to unicast services and groupcast services in NR V2X. Therefore, how to perform HARQ-ACK and/or CSI feedback is a problem needing to be studied and solved.

Addressed to at least one of the above problems, embodiments of this disclosure provide methods and apparatuses for transmitting and receiving sidelink information.

According to a first aspect of the embodiments of this disclosure, there is provided a method for transmitting sidelink information, including:
  receiving, by a second device, first data information and/or a reference signal transmitted by at least one first device;
  determining priorities/a priority of second data information and/or feedback information for the first data information and/or the reference signal;
  allocating power for the second data information and/or the feedback information according to the priority/priorities; and
  transmitting to the at least one first device the second data information and/or the feedback information being allocated with power.

According to a second aspect of the embodiments of this disclosure, there is provided an apparatus for transmitting sidelink information, including:
  a receiving unit configured to receive first data information and/or a reference signal transmitted by at least one first device;
  a priority determining unit configured to determine priorities/a priority of second data information and/or feedback information for the first data information and/or the reference signal;
  a power allocating unit configured to allocate power for the second data information and/or the feedback information according to the priority/priorities; and
  a transmitting unit configured to transmit to the at least one first device the second data information and/or the feedback information being allocated with power.

According to a third aspect of the embodiments of this disclosure, there is provided a method for transmitting sidelink information, including:

receiving, by a second device, first data information and/or a reference signal transmitted by at least one first device;

scrambling and/or indicating feedback information for the first data information and/or reference signal and/or second data information by using an identifier; and transmitting to the at least one first device the scrambled and/or indicated feedback information and/or second data information.

According to a fourth aspect of the embodiments of this disclosure, there is provided an apparatus for transmitting sidelink information, including:

a receiving unit configured to receive first data information and/or a reference signal transmitted by at least one first device;

a processing unit configured to scramble and/or indicate feedback information for the first data information and/or reference signal and/or second data information by using an identifier; and a transmitting unit configured to transmit to the at least one first device the scrambled and/or indicated feedback information and/or second data information.

According to a fifth aspect of the embodiments of this disclosure, there is provided a method for receiving sidelink information, including:

transmitting first data information and/or a reference signal by a first device to a second device; wherein the second device determines priorities/a priority of second data information and/or feedback information for the first data information and/or the reference signal, and allocates power for the second data information and/or the feedback information according to the priority/priorities; and receiving, by the first device, the second data information and/or the feedback information allocated with power transmitted by the second device.

According to a sixth aspect of the embodiments of this disclosure, there is provided an apparatus for receiving sidelink information, including:

a transmitting unit configured to transmit first data information and/or a reference signal to a second device; wherein the second device determines priorities/a priority of second data information and/or feedback information for the first data information and/or the reference signal, and allocates power for the second data information and/or the feedback information according to the priority/priorities; and a receiving unit configured to receive the second data information and/or the feedback information allocated with power transmitted by the second device.

According to a seventh aspect of the embodiments of this disclosure, there is provided a method for receiving sidelink information, including:

transmitting first data information and/or a reference signal by a first device to a second device; wherein the second device scrambles and/or indicates feedback information for the first data information and/or the reference signal and/or second data information by using an identifier;

receiving by the first device the feedback information and/or the second data information scrambled and/or indicated by the second device; and descrambling and/or demodulating the feedback information and/or the second data information by using the identifier.

According to an eighth aspect of the embodiments of this disclosure, there is provided an apparatus for receiving sidelink information, including:

a transmitting unit configured to transmit first data information and/or a reference signal by a first device to a second device; wherein the second device scrambles and/or indicates feedback information for the first data information and/or the reference signal and/or second data information by using an identifier;

a receiving unit configured to receive the feedback information and/or the second data information scrambled and/or indicated by the second device; and a processing unit configured to descramble and/or demodulate the feedback information and/or the second data information by using the identifier.

According to a ninth aspect of the embodiments of this disclosure, there is provided a communication system, including:

a first device configured to transmit first data information and/or a reference signal to a second device, and receive second data information and/or feedback information for the first data information and/or the reference signal transmitted by the second device; and the second device configured to determine priorities/a priority of the second data information and/or the feedback information, and allocate power for the second data information and/or the feedback information according to the priorities/priority, and/or, scramble and/or indicate the feedback information and/or the second data information by using an identifier.

An advantage of the embodiments of this disclosure exists in that the second device determines the priorities/the priority of the second data information and/or the feedback information, and allocates power for the second data information and/or the feedback information according to the priority/priorities, and/or, the second device scrambles and/or indicates the feedback information and/or the second data information by using the identifier. Hence, supporting multiple unicast sessions or groupcast sessions by the same device may be achieved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the sev

DETAILED DESCRIPTION

Figure 1:
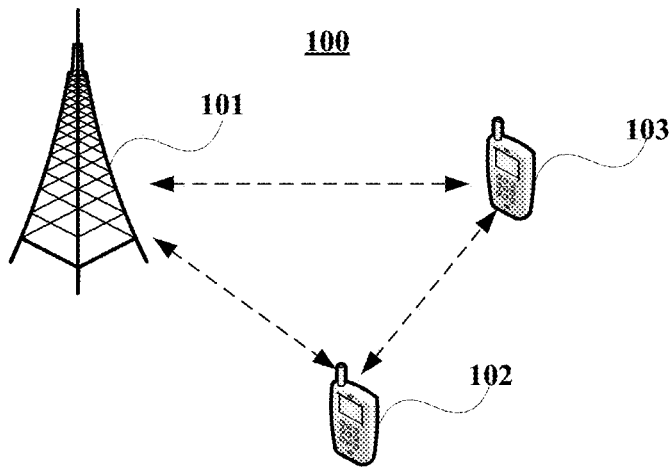
- FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence of addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Furthermore, the term "network side" or "network device side" refers to a side of a network, which may be a base station, or may include one or more of the above network devices. And the term "user side" or "user equipment side" refers to a side of a user or a terminal, which may be a UE, or may include one or more of the above terminal equipments.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, description is given in FIG. 1 by taking two terminal equipments and one network device only as an example; however, the embodiments of this disclosure are not limited thereto.

In the embodiment of this disclosure, existing traffics or traffics that may be implemented in the future may be performed between the network device 101 and the terminal equipments 102, 103. For example, such traffics may include but not limited to an enhanced mobile broadband (eMBB), massive machine type communication (MTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and the other terminal equipment 103 is outside the coverage of the network device 101 and perform sidelink transmission to implement V2X communications.

The embodiments of this disclosure shall be described by taking a sidelink and V2X as examples; however, this disclosure is not limited thereto.

Embodiment 1

The embodiments of this disclosure provide a method for transmitting sidelink information, which shall be described from a transmitting device (also referred to as a second device or a destination device). The transmitting device may be a terminal equipment; however, this disclosure is not limited thereto; for example, it may also be a roadside device or a network device.

Figure 2:
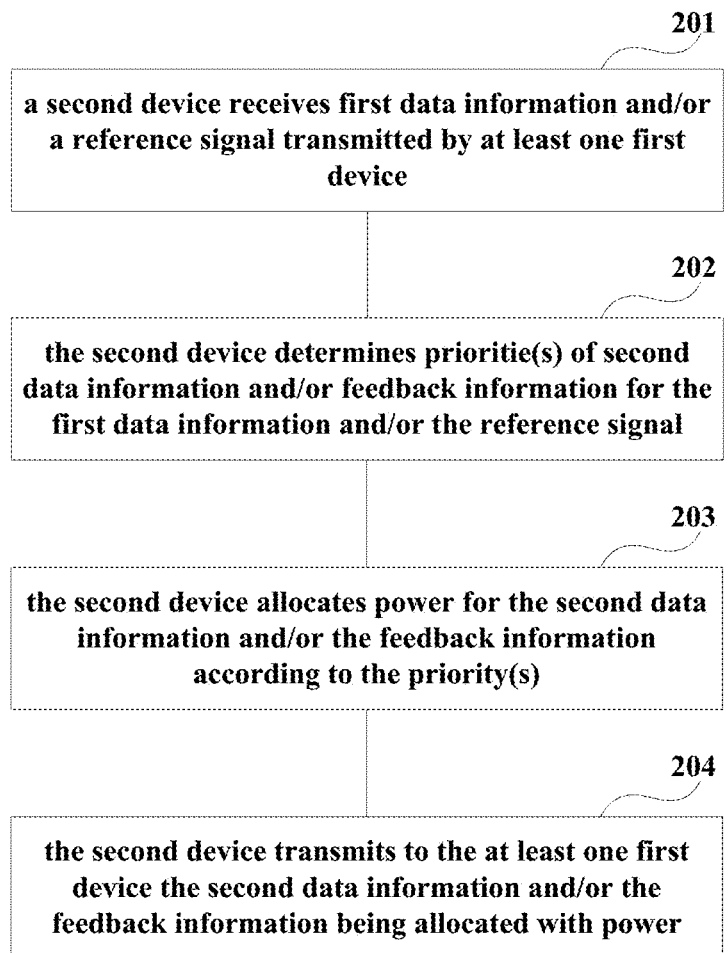
FIG. 2 is a schematic diagram of the method for transmitting sidelink information of an embodiment of this disclosure.

FIG. 2 is a schematic diagram of the method for transmitting sidelink information of the embodiment of this disclosure. As shown in FIG. 2, the method includes:

step 201: a second device receives first data information and/or a reference signal transmitted by at least one first device;

step 202: the second device determines priorities/a priority of second data information and/or feedback information for the first data information and/or the reference signal;

step 203: the second device allocates power for the second data information and/or the feedback information according to the priority/priorities; and step 204: the second device transmits to the at least one first device the second data information and/or the feedback information being allocated with power.

It should be noted that FIG. 2 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 2.

In an embodiment, the feedback information may include at least one of the following: hybrid automatic repeat request acknowledgement (HARQ-ACK, which may include ACK/NACK) information, channel state information (CSI), a modulation and coding scheme (MCS), channel quality indicator (CQI), a precoding matrix indicator (PMI), a rank indicator (RI), beam information, reference signal received power (RSRP), reference signal received quality (RSRQ), pathloss (pathgain), sounding reference signal resource indicator (SRI, SRS resource indicator), a channel state information reference signal (CSI-RS) resource indicator (CRI, CSI-RS resource indicator), an interference condition, motion information; however, this disclosure is not limited thereto, and other information may also be included.

Following description shall be given by taking HARQ-ACK and/or CSI as an example. For the sake of simplicity, the HARQ-ACK and/or CSI may be denoted as HARQ-ACK/CSI in this document. In addition, "feedback" and "report" in this text may have identical or similar meanings, the feedback information and the HARQ-ACK/CSI may have identical or similar meanings. In expressing a meaning of sidelink control information, PSCCH and SCI may be interchanged, and are not distinguished exactly.

In the embodiment of this disclosure, the sidelink feedback information may also be referred to as sidelink feedback control information (SFCI). A dedicated physical channel carrying the feedback information may be referred to as a physical sidelink feedback control channel (PSFCCH). A source device (first device) transmits unicast data (such as scheduling a PSSCH by a PSCCH) and/or a reference signal to the destination device (second device). The destination device transmits the feedback information to the source device. A source ID and a destination ID are used to identify the source device and the destination device, respectively, and may be notified to the destination device via the PSCCH.

In the embodiment of this disclosure, the destination device may also transmit the second data information to the source device; that is, the information transmitted by the second device to the first device may include the second data information and/or feedback information (for the first data information and/or the reference signal). The second data information and the feedback information may be carried in a PSSCH or a PSFCCH; or, the feedback information may be carried in a PSCCH or a PSFCCH, and the second data information may be carried in a PSSCH.

Figure 3:
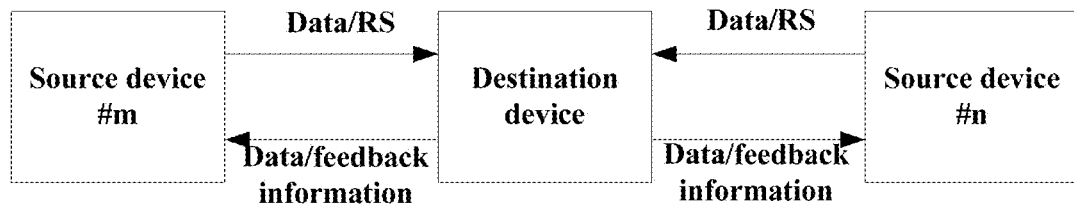
FIG. 3 is a schematic diagram of the first device and the second device of the embodiment of this disclosure.

FIG. 3 is a schematic diagram of the first device and the second device of the embodiment of this disclosure. As shown in FIG. 3, one or more (at least one) first devices (source devices) may transmit data/a reference signal (first data information and/or reference signal) to a second device (destination device), and the second device may transmit data/feedback information (second data information and/or HARQ-ACK/CSI) to the first device.

For example, taking HARQ-ACK as an example, the destination device receives unicast data from different source devices, so it needs to transmit HARQ-ACK to different source devices. The destination device may need to transmit more than one piece of feedback information at the same time, that is, transmitting feedback information to more than one source devices. For example, when there is no global scheduling at a network side (base station) (such as in LTE V2X Mode 4 or NR V2X Mode 2), the V2X device needs to determine HARQ-ACK timing by itself (for example, the source device notifies the destination device via the PSCCH of when transmit HARQ-ACK), and as each source device independently determines the HARQ-ACK timing, even in the same carrier, it is possible that the destination device needs to feed back more than one piece of HARQ-ACK at the same time.

Figure 4:
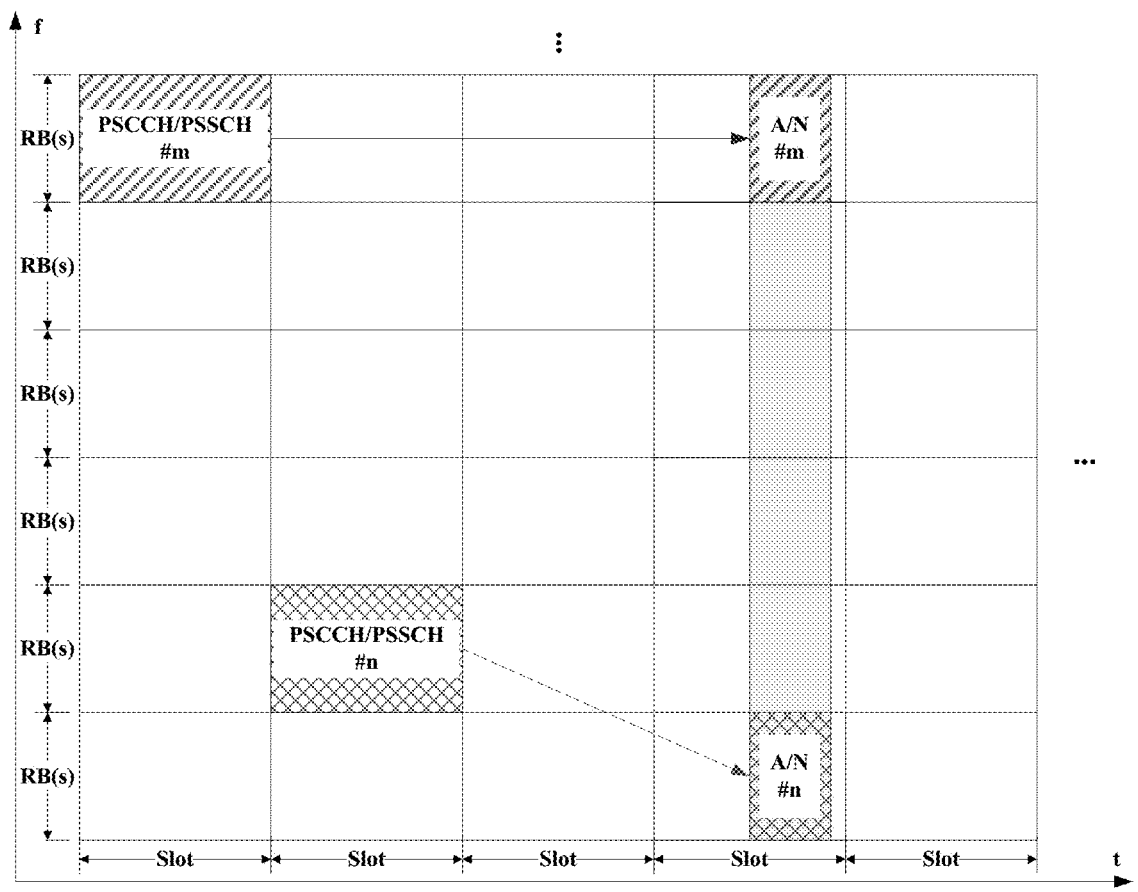
FIG. 4 is an exemplary diagram of the feedback information of the embodiment of this disclosure.

FIG. 4 is an exemplary diagram of the feedback information of the embodiment of this disclosure. As shown in FIG. 4, HARQ-ACK (denoted by A/N in FIG. 4) for the first data information (denoted by PSCCH/PSSCH in FIG. 4) may be carried by a PSFCCH. For example, a first device transmits a PSCCH/PSSCH with a sequence number #m, and another first device transmits a PSCCH/PSSCH with a sequence number #n, and for these two PSCCH/PSSCHs, the second device transmits feedback information A/N #m and A/N #n at the same slot on different resource blocks (RBs).

It should be noted that FIG. 4 is described only by taking transmitting multiple pieces of HARQ-ACK feedback information as an example, and any piece of feedback information in the multiple pieces feedback information in FIG. 4 may also be CSI, or HARQ-ACK and CSI. In addition, while the destination device transmits the HARQ-ACK/CSI feedback information, it may also have data information needing to be transmitted to the source device. At this moment, the HARQ-ACK/CSI feedback information may be transmitted together with the data information via a PSSCH or a PSFCCH, and the information transmitted at this moment includes data information and feedback information.

Information including the second data information and/or feedback information may be transmitted via the PSSCH or PSFCCH, or information including the feedback information only may be transmitted via the PSFCCH or PSCCH. For example, the destination device in FIG. 3 may transmit information including the second data information and feedback information to the source device #m, and at the same time transmit information including only the feedback information to the source device #n.

The HARQ-ACK/CSI may also be transmitted to a network device (such as a base station) via a Uu interface (by a PUCCH or PUSCH). For ease of expression, the information transmitted via the Uu interface may be referred to as Uu information in the embodiment of this disclosure. For example, the destination device and source device #m in FIG. 3 are both within the coverage of the base station, and the source device #m works in a base station scheduling mode (in NR V2X Mode 1), then the destination device may directly transmit the HARQ-ACK/CSI transmitted to the source device #m to the base station via the Uu interface; while transmitting the Uu information, the destination device may also transmit the feedback information via the PSFCCH to the source device #n outside the coverage of the base station.

Therefore, when a device needs to transmit multiple pieces of information (which may include the data information and/or the feedback information) at the same time, from the perspective of a bearer channel, the above information may be transmitted via the PSFCCH, or may be transmitted via the PSSCH, or may be transmitted via the PSCCH, or may be transmitted via the Uu interface; and from the perspective of information contents, any of the above information may include HARQ-ACK only, or may include CSI only, or may include data information only, or may include both HARQ-ACK and CSI, or may include both HARQ-ACK and data information, or may include both CSI and data information, or may include HARQ-ACK, CSI and data information.

In an embodiment, a symbol located in front of a physical sidelink control channel or a physical sidelink feedback control channel is used for a guard interval and/or automatic gain control (AGC).

Figure 5:
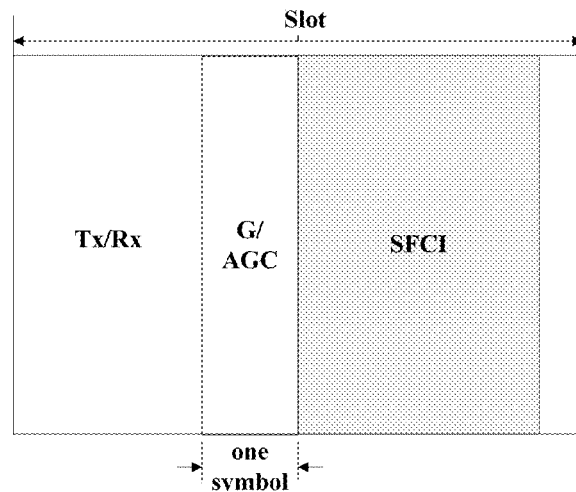
FIG. 5 is an exemplary diagram of a PSFCCH carrying SFCI of the embodiment of this disclosure.

FIG. 5 is an exemplary diagram of a PSFCCH carrying SFCI of the embodiment of this disclosure. Taking a slot as an example, in a slot transmitting the SFCI, a symbol is reserved before a symbol carrying the SFCI, which is used for a guard interval (denoted by G in FIG. 5) of transmission/reception (Tx/Rx) switching and AGC adjustment.

Based on the requirements of RAN4, a time for transmission/reception switching and AGC adjustment may be less than 1 symbol, so only 1 symbol may be reserved for a guard period and/or AGC; for example, a former part of the symbol may be used for a guard interval of the transmission/reception switching, and a latter part of the symbol may be used for AGC adjustment.

In the embodiment of this disclosure, such waveforms as orthogonal frequency division multiplex (OFDM), single-carrier frequency division multiple access (SC-FDMA), or discrete Fourier transform spread orthogonal frequency division multiplex (DFT-s-OFDM), etc., may be used, so the above symbol may be an OFDM, SC-FDMA or DFT-s-OFDM symbol, etc., hereinafter referred to as a symbol; however, this disclosure is not limited thereto.

In an embodiment, the priority/priorities of the second data information and/or the feedback information may be determined according to a quality of service (QOS) parameter. For example, the quality of service parameter may include at least one of the following: a data packet priority (priority and/or PPPP (ProSe per-packet priority)), latency, a reliability, a minimum required communication range, a ProSe per-packet reliability (PPPR), a channel busy ratio (CBR), a channel occupancy ratio (CR); however, this disclosure is not limited thereto.

The QoS parameter may be notified to the second device by the network device or the first device via signaling, for example, by using at least one of dynamic signaling PSCCH, radio resource control (RRC) signaling, a media access control (MAC) control element (CE), a system message, a broadcast message; or it may also be notified to a physical layer by a higher layer of the second device.

In the embodiment of this disclosure, layer 1 (L1) includes, for example, a physical layer, layer 2 (L2) includes, for example, an MAC layer, a radio link control (RLC) layer, etc., and a layer higher than layer 2 may include a radio resource control (RRC) layer, a V2X application layer (V2X), a layer above an access layer, etc.; here, the higher layer may refer to a layer higher than layer 1.

Reference may be made to related techniques for particular definitions of the protocol layers.

In step 202, determining priorities/a priority of second data information and/or feedback information by the the second device, for example, may include at least one of the following:

in one embodiment, determining the priority of the second data information according to a quality of service parameter indicated by sidelink control information (SCI) scheduling the second data information and/or a quality of service parameter of the second data information notified by a higher layer;

for example, the priority of the data information is determined by a data packet priority field (such as priority) in a PSCCH scheduling the data information;

in one embodiment, determining a priority of a hybrid automatic repeat request acknowledgment information of the first data information according to a quality of service parameter indicated by sidelink control information of the first data information and/or a quality of service parameter of the first data information notified by a higher layer;

for example, for feedback information containing only HARQ-ACK, its priority is dependent on QoS parameter(s) of a PSSCH/PSCCH associated with the HARQ-ACK, the "PSSCH/PSCCH associated with the HARQ-ACK" indicating that the HARQ-ACK is feedback for a PSSCH scheduled by a PSCCH;

for another example, the second device needs to transmit multiple pieces of HARQ-ACK at the same time; a field in a PSCCH associated with an HARQ-ACK indicates a priority of data packet, and the priority of the HARQ-ACK may be determined based on the field, HARQ-ACK with a higher packet priority having a higher priority;

in one embodiment, determining the priority of the channel state information according to a preset threshold associated with the channel state information;

for example, a priority threshold may be set, and the priority threshold may be taken as a priority of the CSI;

in one embodiment, a priority of feedback information containing only the hybrid automatic repeat request acknowledgement information is higher than a priority of feedback information containing only the channel state information;

in one embodiment, a priority of feedback information containing both the hybrid automatic repeat request acknowledgement information and the channel state information is equal to a higher priority included in the hybrid automatic repeat request acknowledgement information and the channel state information;

for example, for the feedback information containing both the HARQ-ACK and the CSI, its priority is the higher priority in the HARQ-ACK and CSI, such as the priority of the HARQ-ACK;

in one embodiment, the priority of first information containing both the second data information and the hybrid automatic repeat request acknowledgement information is equal to a higher priority in the included second data information and the automatic repeat request acknowledgement information;

for example, for the first information including data information and HARQ-ACK, a priority of the data information may be higher than a priority of the HARQ-ACK; for example, data information services have requirements on latency higher than those of data information services associated with the HARQ-ACK, and at this moment, data information services with the higher requirements on latency are need to be preferentially satisfied, and the priority of the data information is higher than that of the HARQ-ACK; hence, when the priority of the data information is higher than the priority of the HARQ-ACK, the priority of the first information is the priority of the data information;

in one embodiment, a priority of second information containing both the second data information and the channel state information is equal to a higher priority included in the second data information and channel state information;

for example, for the second information containing the data information and the CSI, in order to determine the higher priority in the data information and the CSI, a priority threshold may be set; for example, the priority threshold is taken as the priority of CSI, and when the priority of the data information is higher than the priority threshold, the data information has a priority higher than that of the CSI; otherwise, the data information has a priority lower than that of the CSI; the above priority threshold may be configured via at least one of a dynamic signaling PSCCH, RRC signaling, an MAC CE, a system message, a broadcast message, or May be predefined; and the priority of the second information is equal to the higher priority included in the data information and the CSI;

in one embodiment, a priority of third information containing the second data information, the hybrid automatic repeat request acknowledgement information and the channel state information is equal to the highest priority in the included second data information, hybrid automatic repeat request acknowledgement information and channel state information;

for example, for the third information including the data information, HARQ-ACK and CSI, a priority of the third information is the highest priority in the data information, HARQ-ACK and CSI;

in one embodiment, the priorities of the second data information and/or the feedback information may be ranked.

It should be noted that the above implementations only illustrate the embodiment of this disclosure. However, this disclosure is not limited thereto, and appropriate variants may be made on the basis of these implementations. For example, the above implementations may be executed separately, or one or more of them may be executed in a combined manner.

In step 203, the second device allocates power for the second data information and/or the feedback information according to the priority, including, for example, at least one of the following:

in one embodiment, allocating power only for the second data information and/or the feedback information with a highest priority/priorities; for example, allocating power only for (one or more pieces of) second data information and/or feedback information with a priority 1 (the highest priority), and not transmitting information with other priorities (such as lower priorities 2, 3);

in one embodiment, preferentially allocating power for the second data information and/or the feedback information with relatively high priority/priorities in a descending order of priorities; and if there is remaining power, allocating power for the second data information and/or the feedback information with relatively low priority/priorities;

for example, allocating power for (one or more pieces of) the second data information and/or feedback information with a priority 1 (the highest priority), if there is remaining power, allocating power for (one or more pieces of) the second data information and/or the feedback information with a priority 2, and so on for (one or more pieces of) the second data information and/or the feedback information with priorities 3, 4;

in one embodiment, when the power allocated for the second data information and/or the feedback information is less than a minimum power required by power control, not allocating power for the second data information and/or the feedback information or not transmitting the second data information and/or the feedback information;

in one embodiment, for at least two pieces of information with the same priority, such as information containing not only the HARQ-ACK or information containing not only the CSI, determining an order of power allocation by comparing priorities of contents;

in one embodiment, for fourth information containing at least the second data information and first feedback information containing at least the hybrid automatic repeat request acknowledgement information with identical priorities, preferentially allocating power for the first feedback information; wherein the priority of the fourth information is equal to the priority of the second data information, and the priority of the first feedback information is equal to the priority of the hybrid automatic repeat request acknowledgement information;

for example, for information 1 and information 2 with identical priorities, if the HARQ-ACK in information 1 has a highest priority, and information 2 is the fourth information containing at least data information and the data information in the fourth information has the highest priority, that is, the priority of the HARQ-ACK is equal to the priority of the data information, preferentially allocating power for information 1;

in one embodiment, for second feedback information containing only the hybrid automatic repeat request acknowledgement information and third feedback information containing both the hybrid automatic repeat request acknowledgement information and the channel state information with identical priorities, preferentially allocating power for the third feedback information;

for example, for information 1 and information 2 with identical priorities, information 1 contains the HARQ-ACK, information 2 contains the HARQ-ACK and the CSI, and as the CSI in information 2 has a priority, preferentially allocating power for information 2;

in one embodiment, for the second data information and/or fourth feedback information located on a primary carrier and the second data information and/or fifth feedback information not located on the primary carrier with identical priorities, preferentially allocating power for the second data information and/or fourth feedback information located on the primary carrier;

for example, for information 1 and information 2 with identical priorities, if information 1 and information 2 are located on the same carrier, an order of power allocation information 1 and information 2 may be arbitrarily determined; and if information 1 is located in a primary cell and information 2 is located in a secondary cell, preferentially allocating power for information 1.

It should be noted that the above implementations only illustrate how to allocate power according to the priorities in the embodiment of this disclosure. However, this disclosure is not limited thereto, and appropriate variants may be made on the basis of these implementations. For example, the above implementations may be executed separately, or one or more of them may be executed in a combined manner.

In addition, the embodiment of this disclosure also be extended to priority determination and power allocation between sidelink data information and sidelink feedback information. For example, the destination device may need to transmit feedback information and data information to different source devices at the same time, or the destination device needs to transmit multiple pieces of data information of unicast, broadcast and groupcast, and QoS parameters may also be used to determine the priority of data information, and subsequent power allocation may be performed according to the priorities of the data information and feedback information.

In an embodiment, the second device may further adjust and/or select transmission resources for the second data information and/or the feedback information according to the priorities.

Figure 6:
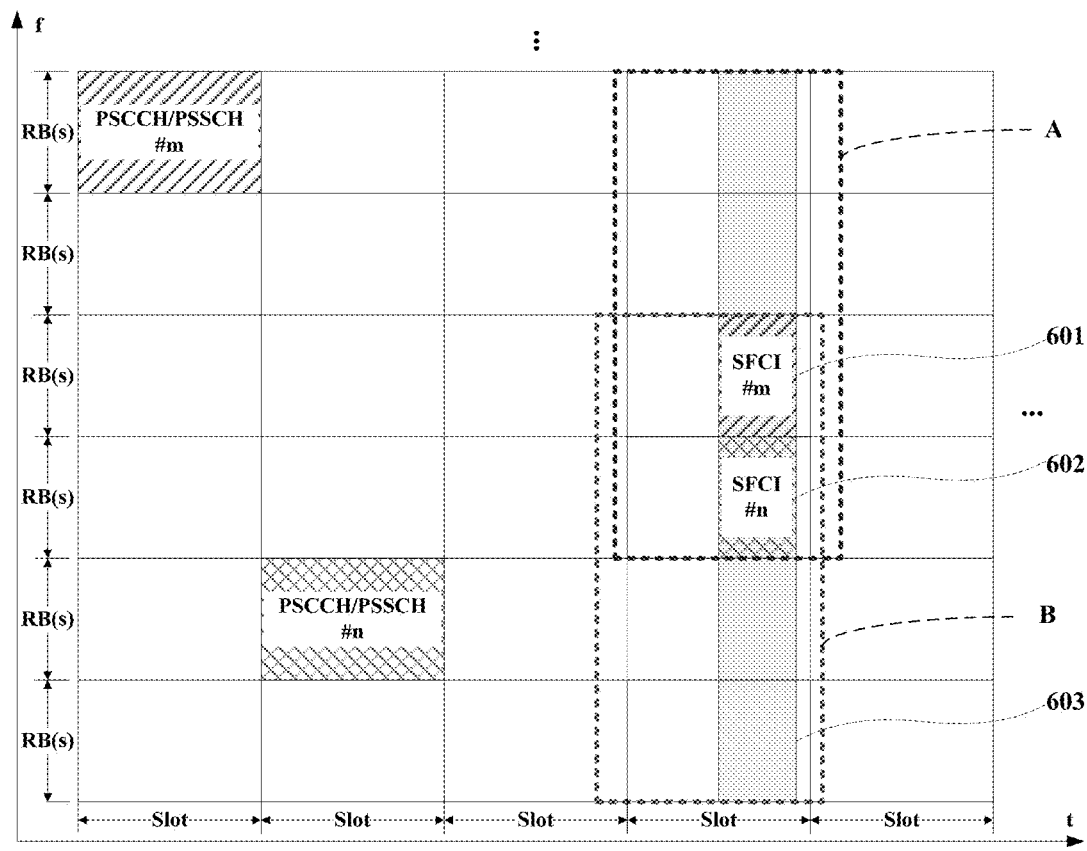
FIG. 6 is another exemplary diagram of the feedback information of the embodiment of this disclosure.

FIG. 6 is another exemplary diagram of the feedback information of the embodiment of this disclosure. As shown in FIG. 6, for example, the feedback information for the first data information (denoted by PSCCH/PSSCH in FIG. 6) is denoted by SFCI, and resources for transmitting the SFCI may be overlapped.

For example, as shown in FIG. 6, a candidate transmission resource set for the first device #m is as shown by A, and a candidate transmission resource set for the first device #n is as shown by B, hence, a resource 601 (or resource 602) in an overlapped area is possible to be determined as a transmission resource for transmitting SFCI #m and SFCI #n, thereby causing resource collision.

In one embodiment, in a case where transmission resources of the second data information and/or the feedback information with relatively low priorities overlap transmission resource of the second data information and/or the feedback information with relatively high priorities, the second data information and/or the feedback information with relatively low priorities are not transmitted.

For example, in a case where both SFCI #m and SFCI #n are allocated with resource 601, if the priority of SFCI #m is higher than the priority of SFCI #n, the second device transmits SFCI #m by using resource 601, and does not transmit SFCI #n.

In another embodiment, in a case where transmission resources of the second data information and/or the feedback information with relatively low priorities overlap transmission resource of the second data information and/or the feedback information with relatively high priorities, transmission resources are reselected for the second data information and/or the feedback information with relatively low priorities.

For example, in a case where both SFCI #m and SFCI #n are allocated with resource 601, if the priority of SFCI #m is higher than the priority of SFCI #n, the second device transmits SFCI #m by using resource 601, and reselects a resource to transmit SFCI #n, such as selecting a non-overlapped resource 603 to transmit SFCI #n, or selects resource 602 located in the overlapped area to transmit SFCI #n.

In an embodiment, the above candidate resource sets may be configured by the source device establishing a unicast session with the destination device or configured by the base station. As an interference environment in which the source device and the destination device are located is independent, the source device take a resource set receiving relatively few interference by itself as a candidate resource set, and configure and recommend it to the destination device; and according to an interference condition of itself, the destination device may select a resource receiving relatively few interference by itself from the candidate resource set for transmission of the feedback information, and the source device performs blind detection on the feedback information in the candidate resource set, thereby improving reliability of the transmission of the feedback information.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that the second device determines the priorities/the priority of the second data information and/or the feedback information, and allocates power for the second data information and/or the feedback information according to the priority/priorities. Hence, supporting multiple unicast sessions or groupcast sessions by the same device may be achieved.

Embodiment 2

For example, as described in Embodiment 1, the candidate resource sets configured by different source devices may overlap. If the destination device transmits the feedback information on the overlapped resources, multiple source devices may all receive the feedback information. And if only feedback information with relatively high priorities is transmitted on the overlapped resources, the source devices need to be able to distinguish whether the feedback information is feedback information of its own; or if multiple pieces of feedback information is transmitted on the overlapped resources, the source devices need to be able to distinguish which piece of feedback information is feedback information of its own.

For another example, taking into account that a source device may establish unicast sessions with multiple destination devices, when multiple destination devices transmit feedback information at the same slot, the source device needs further to distinguish feedback information and a destination device from which the feedback information comes.

For a further example, taking into account that the source device performs blind detection on the feedback information in the candidate resource set, and other source devices and destination devices having established unicast sessions may also transmit feedback information in the resource set, hence, the source device needs further to be able to distinguish which feedback information is feedback information transmitted to it.

For still another example, even if the candidate resource set is not used (the destination device does not select a resource on its own), but the source device or base station notifies the destination device via signaling to transmit the feedback information by using a resource, the destination device may possibly be configured on the same resource to transmit multiple piece of feedback information to multiple source devices. Assuming that the destination device only transmits a piece of feedback information with the highest priority based on the priority of the feedback information, the source device also needs to be able to distinguish whether the feedback information is feedback information transmitted to it.

The embodiments of this disclosure provide a method for transmitting sidelink information, which shall be described from a transmitting device (also referred to as a second device or a destination device). The transmitting device may be a terminal equipment; however, this disclosure is not limited thereto; for example, it may also be a roadside device or a network device. And reference may be made to Embodiment 1 for contents identical to those in Embodiment 1 (such as the feedback information, etc.).

Figure 7:
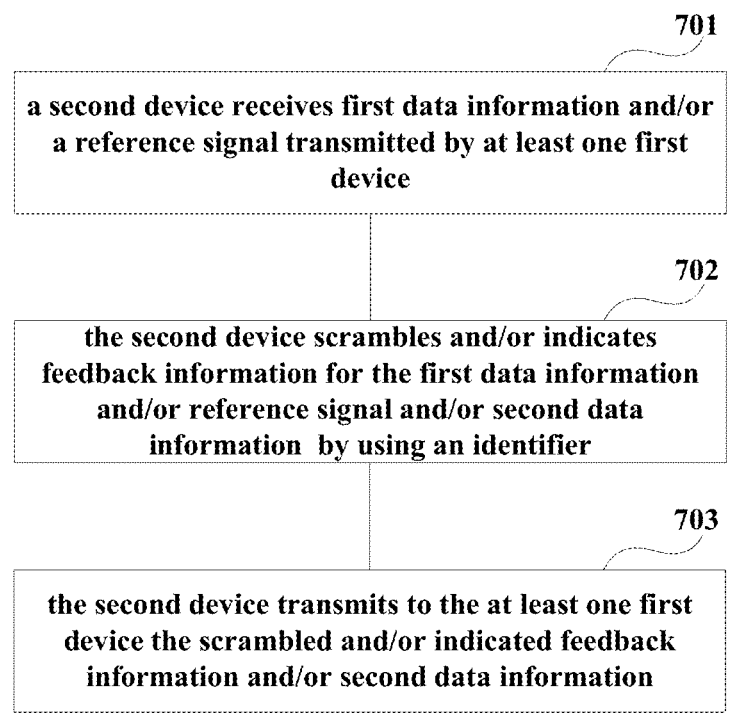
FIG. 7 is another schematic diagram of the method for transmitting sidelink information of the embodiment of this disclosure.

FIG. 7 is a schematic diagram of the method for transmitting sidelink information of the embodiment of this disclosure. As shown in FIG. 7, the method includes:

step 701: a second device receives first data information and/or a reference signal transmitted by at least one first device;

step 702: the second device scrambles and/or indicates feedback information for the first data information and/or reference signal and/or second data information by using an identifier; and step 703: the second device transmits to the at least one first device the scrambled and/or indicated feedback information and/or second data information.

It should be noted that FIG. 7 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 7.

In an embodiment, the identifier may include at least one of the following: an identifier of the first device, an identifier of the second device, a session identifier, a sidelink identifier, a device group identifier; however, this disclosure is not limited thereto, and it may also be other identifiers.

For example, as the source identifier may identify the source device, the destination identifier may identify the destination device, the session ID may identify a unicast session, and the device group identifier may indicate a groupcast session, the feedback information may be distinguished based on at least one of the source identifier, destination identifier, session identifier, sidelink identifier and device group identifier.

In an embodiment, the scrambling the feedback information and/or the second data information by using an identifier may include: determining an initial value of a scrambling sequence generation function according to at least a part of the identifier; generating a scrambling sequence by using the scrambling sequence generation function; and scrambling one or more bits and/or cyclic redundancy check (CRC) of the feedback information and/or the second data information by using the scrambling sequence.

For example, by using a scrambling sequence to scramble the bits of the information, the bits of the information before channel coding may be scrambled, or the bits of the information after coding may be scrambled. A scrambling sequence generator generates the above scrambling sequence by taking a function value as the initial value. The above function may take at least one of the source identifier, destination identifier, session identifier, sidelink identifier and device group identifier as an argument; for example, the sequence in section 5.2.1 of TS 38.211 standard may be used as the scrambling sequence, and the initial value is set to be $c_{init} = n_D \cdot 2^{15} + n_s$; where $n_D$ and $n_s$ respectively denote the destination identifier and the source identifier.

For another example, the CRC of the information is scrambled by using a scrambling sequence. A scrambling sequence generator generates the above scrambling sequence by taking a function value as the initial value. And above function may take at least one of the source identifier, destination identifier, session identifier, sidelink identifier and device group identifier as an argument.

In an embodiment, the indicating the feedback information and/or the second data information by using an identifier may include: according to the identifier, determining at least one of a sequence, an orthogonal cover code (OCC), a root sequence and a cyclic shift used by the feedback information and/or the second data information.

For example, when the number of the bits of the information is 1 or 2, the information may be indicated by transmitting a sequence in a sequence set. For example, different root sequences of a ZC sequence may be used, and for a root sequence, different cyclic shifts may be used. A root sequence and/or cyclic shift used by the information may be determined based on at least one of the source identifier, the destination identifier, the session identifier, the sidelink identifier and the device group identifier. For another example, different orthogonal cover codes may be used, and an orthogonal cover code used by the information may be determined based on at least one of the source identifier, destination identifier, session identifier, sidelink identifier and device group identifier.

For example, assuming that the number of available root sequences is M and the number of cyclic shifts is N, a function value may be calculated to obtain modulo M or modulo N, and an obtained result is taken as an index of at least one of the sequence, orthogonal cover code, root sequence and cyclic shift to determine at least one of the sequence, orthogonal cover code, root sequence and cyclic shift. The above function may take at least one of the source identifier, destination identifier, session identifier, sidelink identifier and device group identifier as an argument.

By using at least one of different sequences, orthogonal cover codes, root sequences and cyclic shifts, different feedback information may be identified, thereby reducing or eliminating confusion that may occur in receiving the feedback information. At least one of the sequence, orthogonal cover code, root sequence and cyclic shift used in a unicast session may also be indicated via signaling during establishment of the unicast session; for example, a first device having established multiple unicast sessions notifies via signaling at least one of a sequence, an orthogonal cover code, a root sequence and a cyclic shift that may be used to a second device with which the first device establishes the unicast, thereby avoiding conflict and confusion.

In an embodiment, the indicating the feedback information and/or the second data information by using an identifier may further include: containing at least a part of the identifier in payloads/a payload of the feedback information and/or the second data information.

For example, at least one of the source identifier, the destination identifier, the session identifier, the sidelink identifier and the device group identifier is taken as the payload of the feedback information and is transmitted in the feedback information.

For another example, a part of bits of at least one of the source identifier, the destination identifier, the session identifier, the sidelink identifier and the device group identifier is used as the payload of the feedback information, and the remaining part of the bits is used as an argument of a function to calculate a value of the function, the value of the function is taken as an initial value of a scrambling sequence generator to generate a scrambling sequence, and the scrambling sequence is used to scramble the bits of the feedback information and/or the CRC.

In an embodiment, the second device may further add cyclic redundancy check into the feedback information using RM coding or channel coding of a small block length, and/or, add cyclic redundancy check into the feedback information less than or equal to 2 bits.

For example, CRC and/or channel coding is/are used for all the bits of the feedback information, that is, no matter what channel coding is used by the feedback information, such as a polar code, a low-density parity check (LDPC) code, Reed-Muller (RM), and channel coding of small block lengths, etc., CRC is used. Taking into account that the first device will perform blind detection on the feedback information in the candidate resource set, introduction of CRC may effectively prevent a device from interpreting feedback information transmitted to other devices as its own information.

For another example, when the number of the bits of the feedback information is 1 or 2, at least one of repeating, using CRC and channel coding may be performed on bits of the feedback information.

The above embodiments or implementations only illustrate the embodiment of this disclosure. However, this disclosure is not limited thereto, and appropriate variants may be made on the basis of these embodiments or implementations. For example, the above embodiments or implementations may be executed separately, or one or more of them may be executed in a combined manner.

It can be seen from the above embodiments that the second device scrambles and/or indicates the second data information and/or the feedback information by using the identifiers. Hence, supporting multiple unicast sessions or groupcast sessions by the same device may be achieved. Furthermore, interferences to which the feedback information is subject may be reduced, and confusion of feedback information of multiple devices may be prevented.

Embodiment 3

This embodiment is a combination of Embodiment 1 and Embodiment 2, and shall be described from a first device side and a second device side. This embodiment shall be described by taking a first device and a second as examples, with contents identical to those in embodiments 1 and 2 being not going to be described herein any further.

Figure 8:
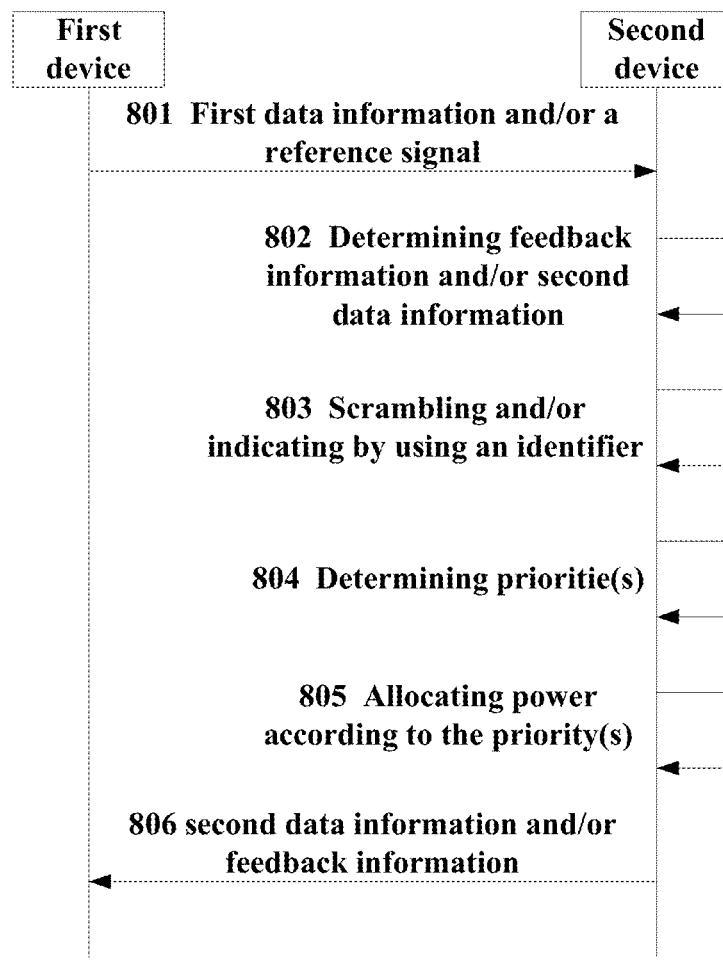
FIG. 8 is a schematic diagram of a method for transmitting and receiving sidelink information of an embodiment of this disclosure.

FIG. 8 is a schematic diagram of a method for transmitting and receiving sidelink information of the embodiment of this disclosure. As shown in FIG. 8, the method includes:

step 801: a first device transmits first data information and/or a reference signal to a second device;

step 802: the second device determines feedback information for the first data information and/or the reference signal, and/or determines second data information to be transmitted;

step 803: the second device scrambles and/or indicates the feedback information and/or the second data information by using an identifier;

step 804: the second device determines a priority/priorities of the feedback information and/or the second data information;

step 805: the second device allocates power to the second data information and/or the feedback information according to the priority/priorities; and step 806: the second device transmits the second data information and/or the feedback information allocated with power to the first device.

It should be noted that FIG. 8 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 8. For example, step 803 may be executed after step 805, or may be executed in parallel with steps 804 and 805.

It can be seen from the above embodiment that the second device determines the priorities/the priority of the second data information and/or the feedback information, allocates power for the second data information and/or the feedback information according to the priority/priorities, and scrambles and/or indicates the second data information and/or the feedback information by using the identifiers. Hence, supporting multiple unicast sessions or groupcast sessions by the same device may be achieved. Furthermore, interferences to which the feedback information is subject may be reduced, and confusion of feedback information of multiple devices may be prevented.

Embodiment 4

The embodiments of this disclosure provide a method for receiving sidelink information, which shall be described from a receiving device (a first device, or a source device), with contents identical to those in embodiments 1 and 3 being not going to be described herein any further. The receiving device may be a terminal equipment; however, this disclosure is not limited thereto; for example, it may also be a roadside device or a network device.

Figure 9:
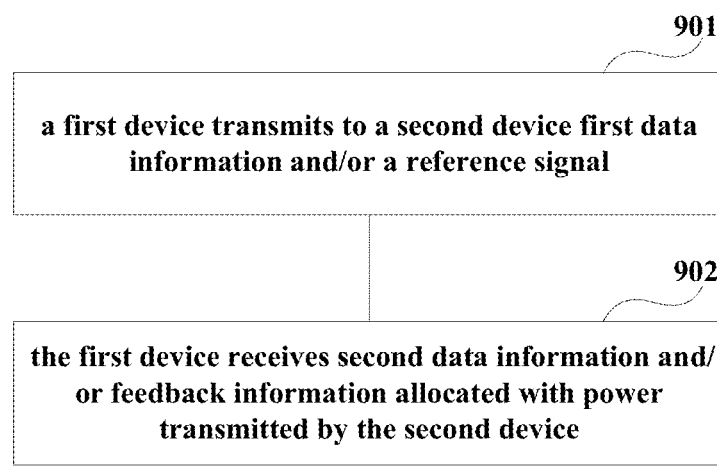
FIG. 9 is a schematic diagram of the method for receiving sidelink information of an embodiment of this disclosure.

FIG. 9 is a schematic diagram of the method for receiving sidelink information of the embodiment of this disclosure, showing a situation at the receiving device side. As shown in FIG. 9, the method includes:

step 901: a first device transmits first data information and/or a reference signal to a second device; wherein the second device determines priorities/a priority of second data information and/or feedback information for the first data information and/or the reference signal, and allocates power for the second data information and/or the feedback information according to the priority/priorities; and step 902: the first device receives the second data information and/or the feedback information allocated with power transmitted by the second device.

In an embodiment, the second data information and/or the feedback information is/are scrambled and/or indicated by the second device by using an identifier; and the first device may further descramble and/or demodulate the data information and/or the feedback information by using the identifier.

It should be noted that FIG. 9 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 9.

It can be seen from the above embodiments that the second device determines the priorities/the priority of the second data information and/or the feedback information, and allocates power for the second data information and/or the feedback information according to the priority/priorities. Hence, supporting multiple unicast sessions or groupcast sessions by the same device may be achieved.

Embodiment 5

The embodiments of this disclosure provide a method for receiving sidelink information, which shall be described from a receiving device (a first device, or a source device), with contents identical to those in embodiments 2 and 3 being not going to be described herein any further. The receiving device may be a terminal equipment; however, this disclosure is not limited thereto; for example, it may also be a roadside device or a network device.

Figure 10:
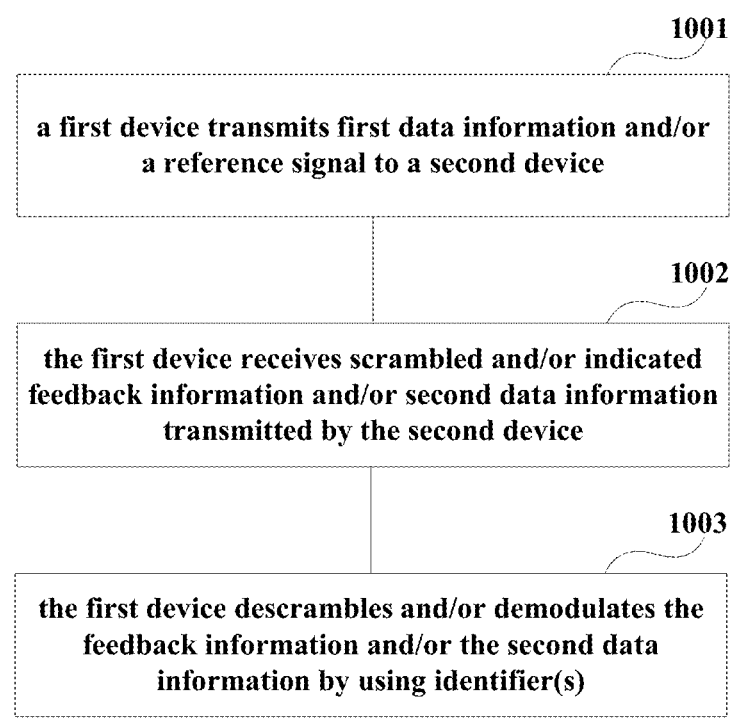
FIG. 10 is another schematic diagram of the method for receiving sidelink information of the embodiment of this disclosure.

FIG. 10 is a schematic diagram of the method for receiving sidelink information of the embodiment of this disclosure, showing a situation at the receiving device side. As shown in FIG. 10, the method includes:

step 1001: a first device transmits first data information and/or a reference signal to a second device; wherein the second device scrambles and/or indicates feedback information for the first data information and/or the reference signal and/or second data information by using an identifier;

step 1002: the first device receives the scrambled and/or indicated feedback information and/or second data information transmitted by the second device; and step 1003: the first device descrambles and/or demodulates the feedback information and/or the second data information by using the identifier.

In an embodiment, the second device may further determine priorities/a priority of the second data information and/or feedback information for the first data information and/or the reference signal, and allocate power for the second data information and/or the feedback information according to the priority/priorities.

It should be noted that FIG. 10 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 10.

It can be seen from the above embodiments that the second device scrambles and/or indicates the feedback information and/or the second data information by using the identifiers. Hence, supporting multiple unicast sessions or groupcast sessions by the same device may be achieved. Furthermore, interferences to which the feedback information is subject may be reduced, and confusion of feedback information of multiple devices may be prevented.

Embodiment 6

The embodiments of this disclosure provide an apparatus for transmitting sidelink information. The apparatus may be a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in embodiments 1, 2 and 3 shall not be described herein any further.

Figure 11:
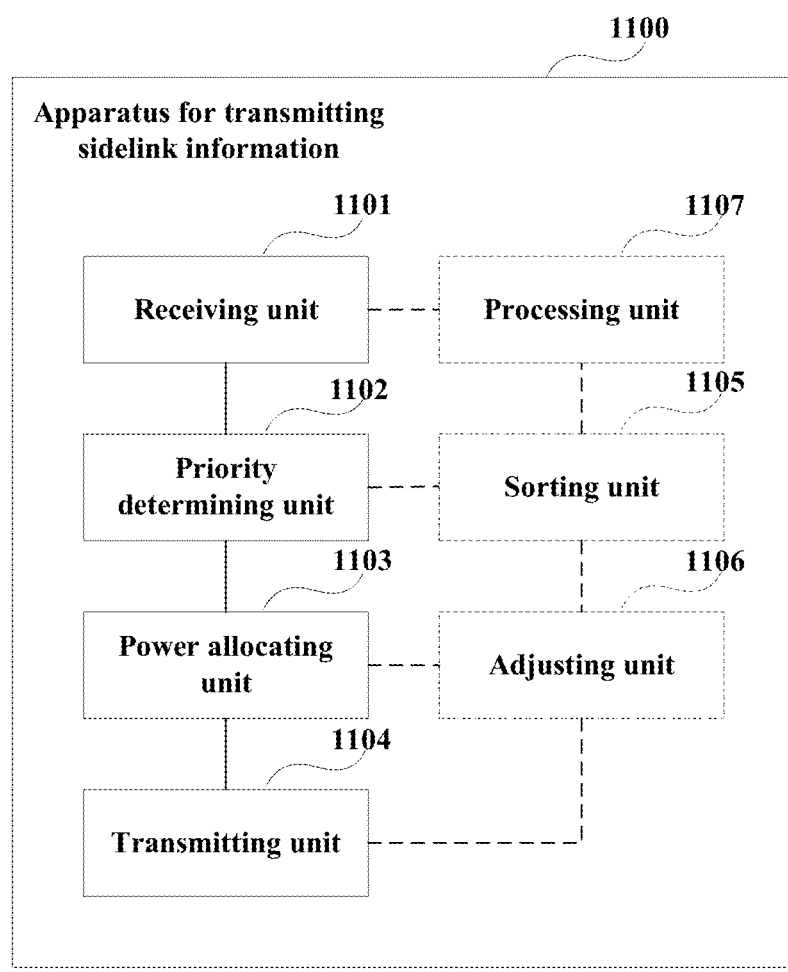
FIG. 11 is a schematic diagram of the apparatus for transmitting sidelink information of an embodiment of this disclosure.

FIG. 11 is a schematic diagram of the apparatus for transmitting sidelink information of an embodiment of this disclosure. As shown in FIG. 11, an apparatus 1100 for transmitting sidelink information includes:
- a receiving unit 1101 configured to receive first data information and/or a reference signal transmitted by at least one first device;
- a priority determining unit 1102 configured to determine priorities/a priority of second data information and/or feedback information for the first data information and/or the reference signal;
- a power allocating unit 1103 configured to allocate power for the second data information and/or the feedback information according to the priority/priorities; and
- a transmitting unit 1104 configured to transmit to the at least one first device the second data information and/or the feedback information being allocated with power.

In an embodiment, the feedback information includes at least one of the following: hybrid automatic repeat request acknowledgement information, channel state information, a modulation and coding scheme, a channel quality indicator, a precoding matrix indicator, a rank indicator, beam information, reference signal received power, reference signal received quality, a pathloss, a sounding reference signal resource indicator, a reference signal resource indicator, an interference condition, motion information.

In an embodiment, the second data information and the feedback information are carried in a physical sidelink data channel or a physical sidelink feedback control channel; or the feedback information is carried in a physical sidelink control channel or a physical sidelink feedback control channel, and the second data information is carried in a physical sidelink data channel.

In an embodiment, a symbol located before the physical sidelink control channel or the physical sidelink feedback control channel is used for guard interval and/or automatic gain control.

In an embodiment, the priority determining unit 1102 determines the priorities/priority of the second data information and/or the feedback information according to a service quality parameter. For example, the service quality parameter includes at least one of the following: a packet priority, latency, a reliability, a minimum needed communication distance, a packet reliability, a channel busy ratio, a channel occupancy ratio.

In an embodiment, the priority determining unit 1102 may perform at least one of the following:
- determining the priority of the second data information according to a service quality parameter indicated by sidelink control information scheduling the second data information and/or a service quality parameter of the second data information notified by a higher layer;
- determining a priority of hybrid automatic repeat request acknowledgement information for the first data information according to a service quality parameter indicated by sidelink control information scheduling the first data information and/or a service quality parameter of the first data information notified by a higher layer;
- determining a priority of channel state information according to a predetermined threshold associated with the channel state information;
- determining that a priority of feedback information containing only hybrid automatic repeat request acknowledgement information is higher than a priority of feedback information containing only channel state information;
- determining that a priority of feedback information containing hybrid automatic repeat request acknowledgement information and channel state information is equal to a higher priority of the contained hybrid automatic repeat request acknowledgement information and channel state information;
- determining that a priority of first information containing the second data information and hybrid automatic repeat request acknowledgement information is equal to a higher priority of the contained second data information and hybrid automatic repeat request acknowledgement information;
- determining that a priority of second information containing the second data information and the channel state information is equal to a higher priority of the contained second data information and channel state information; and
- determining that a priority of third information containing the second data information, hybrid automatic repeat request acknowledgement information and the channel state information is equal to a highest priority of the contained second data information, hybrid automatic repeat request acknowledgement information and channel state information.

In an embodiment, as shown in FIG. 11, the apparatus 1100 for transmitting sidelink information may further include:
- a sorting unit 1105 configured to sort priorities of the second data information and/or the feedback information.

In an embodiment, the power allocating unit 1103 may perform at least one of the following:
- allocating power only for the second data information and/or the feedback information having a highest priority;
- preferentially allocating power for the second data information and/or the feedback information having a higher priority in a descending order of priorities, and allocating power for the second data information and/or the feedback information having a lower priority when there is power remained; and
- not allocating power for the second data information and/or the feedback information or not transmitting the second data information and/or the feedback information when power allocated for the second data information and/or the feedback information is less than a minimum power required by power controlling.

In an embodiment, the power allocating unit 1103 may further perform at least one of the following:
- for fourth information and first feedback information having identical priorities, preferentially allocating power for the first feedback information, the fourth information containing the second data information, and the first feedback information at least containing hybrid automatic repeat request acknowledgement information; wherein the priority of the fourth information is equal to the priority of the second data information, and the priority of the first feedback information is equal to a priority of the hybrid automatic repeat request acknowledgement information;
- for second feedback information and third feedback information having identical priorities, preferentially allocating power for the third feedback information, the second feedback information containing only hybrid automatic repeat request acknowledgement information, and the third feedback information containing hybrid automatic repeat request acknowledgement information and channel state information; and for the second data information and/or fourth feedback information located in a primary carrier and the second data information and/or fifth feedback information not located in a primary carrier having identical priorities, preferentially allocating power for the second data information and/or fourth feedback information located in the primary carrier.

In an embodiment, as shown in FIG. 11, the apparatus 1100 for transmitting sidelink information may further include:

an adjusting unit 1106 configured to adjust and/or select one or more transmission resources for the second data information and/or the feedback information according to the priorities/priority.

In an embodiment, when a transmission resource of the second data information and/or the feedback information having a lower priority overlaps a transmission resource of the second data information and/or the feedback information having a higher priority, the adjusting unit determines not to transmit the second data information and/or the feedback information having a lower priority; or when a transmission resource of the second data information and/or the feedback information having a lower priority overlaps a transmission resource of the second data information and/or the feedback information having a higher priority, the adjusting unit reselects a transmission resource for the second data information and/or the feedback information having a lower priority.

In an embodiment, as shown in FIG. 11, the apparatus 1100 for transmitting sidelink information may further include:

a processing unit 1107 configured to scramble and/or indicate the second data information and/or the feedback information by using an identifier, the identifier including at least one of the following: an identifier of the first device, an identifier of a second device, a session identifier, a sidelink identifier, a device group identifier.

Figure 12:
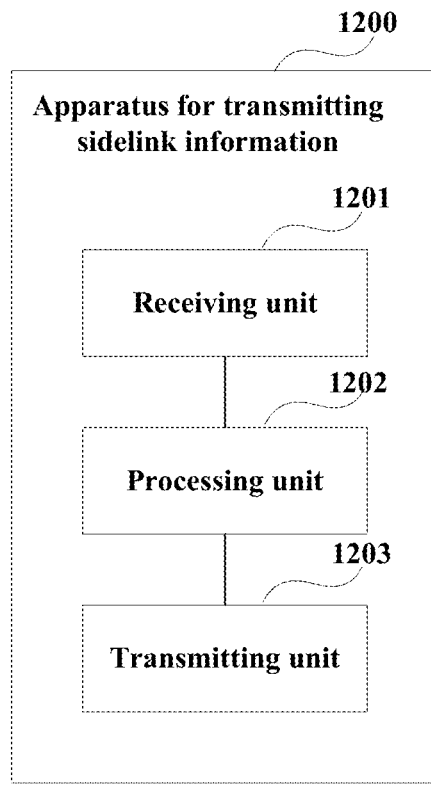
FIG. 12 is another schematic diagram of the apparatus for transmitting sidelink information of the embodiment of this disclosure.

FIG. 12 is another schematic diagram of the apparatus for transmitting sidelink information of the embodiment of this disclosure. As shown in FIG. 12, an apparatus 1200 for transmitting sidelink information includes:

a receiving unit 1201 configured to receive first data information and/or a reference signal transmitted by at least one first device;

a processing unit 1202 configured to scramble and/or indicate feedback information for the first data information and/or the reference signal and/or the second data information by using an identifier; and a transmitting unit 1203 configured to transmit to the at least one first device the scrambled and/or indicated feedback information and/or second data information.

In an embodiment, the identifier includes at least one of the following: an identifier of the first device, an identifier of a second device, a session identifier, a sidelink identifier, a device group identifier.

In an embodiment, the processing unit 1202 may be configured to determine an initial value of a scrambling sequence generation function according to at least a part of the identifier, generate a scrambling sequence by using the scrambling sequence generation function, and scramble one or more bits and/or cyclic redundancy check of the feedback information and/or the second data information by using the scrambling sequence.

In an embodiment, the processing unit 1202 may be configured to, according to the identifier, determine at least one of a sequence, an orthogonal cover code, a root sequence and a cyclic shift used by the feedback information and/or the second data information.

In an embodiment, the processing unit 1202 may be configured to contain at least a part of the identifier in payloads/a payload of the feedback information and/or the second data information.

In an embodiment, the processing unit 1202 may be configured to add cyclic redundancy check into the feedback information using RM coding or channel coding of a small block length, and/or, add cyclic redundancy check into the feedback information less than or equal to 2 bits.

It should be noted that the components or modules related to this disclosure are only described above. However, this disclosure is not limited thereto, and the apparatuses 1100 and 1200 for transmitting sidelink information may further include other components or modules, and reference may be made to related techniques for particulars of these components or modules.

Furthermore, for the sake of simplicity, connection relationships between the components or modules or signal profiles thereof are only illustrated in FIG. 11 or 12. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the second device determines the priorities/the priority of the second data information and/or the feedback information, allocates power for the second data information and/or the feedback information according to the priority/priorities, and/or scrambles or indicates the second data information and/or the feedback information by using the identifiers. Hence, supporting multiple unicast sessions or groupcast sessions by the same device may be achieved. Furthermore, interferences to which the feedback information is subject may be reduced, and confusion of feedback information of multiple devices may be prevented.

Embodiment 7

The embodiments of this disclosure provide an apparatus for receiving sidelink information. The apparatus may be, for example, a terminal equipment, or may be one or more components or assemblies configured in a terminal equipment; however, this disclosure is not limited thereto; for example, it may also be a roadside device or a network device, or may be one or more components or assemblies configured in a roadside device or a network device. Contents in the embodiments identical to those in embodiments 4 and 5 shall not be described herein any further.

Figure 13:
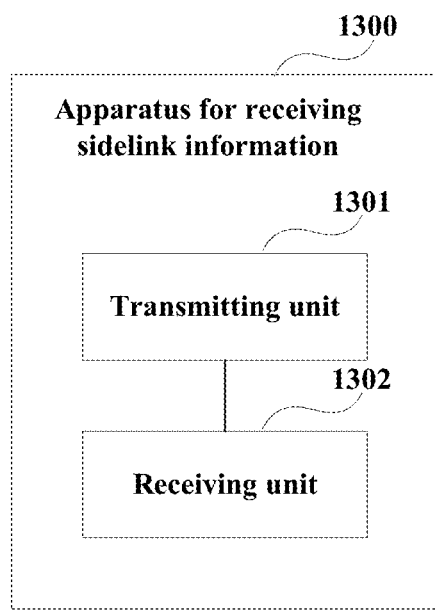
FIG. 13 is a schematic diagram of the apparatus for receiving sidelink information of an embodiment of this disclosure.

FIG. 13 is a schematic diagram of the apparatus for receiving sidelink information of the embodiment of this disclosure. As shown in FIG. 13, an apparatus 1300 for receiving sidelink information includes:

a transmitting unit 1301 configured to transmit first data information and/or a reference signal to a second device; wherein the second device determines priorities/a priority of second data information and/or feedback information for the first data information and/or the reference signal, and allocates power for the second data information and/or the feedback information according to the priority/priorities; and a receiving unit 1302 configured to receive the second data information and/or the feedback information allocated with power transmitted by the second device.

Figure 14:
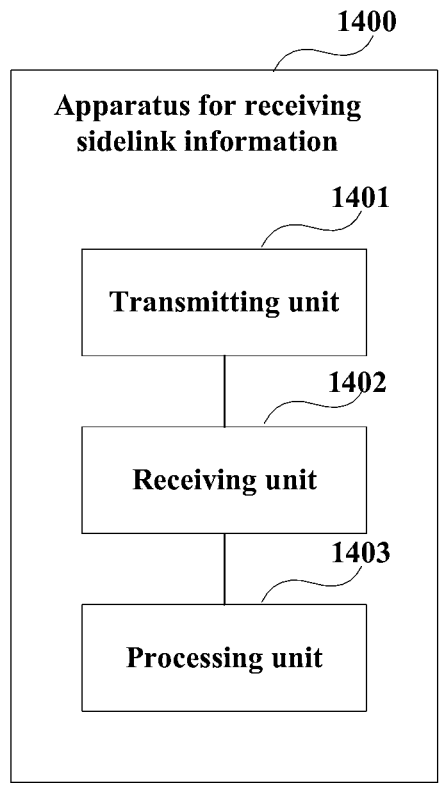
FIG. 14 is another schematic diagram of the apparatus for receiving sidelink information of the embodiment of this disclosure.

FIG. 14 is another schematic diagram of the apparatus for receiving sidelink information of an embodiment of this disclosure. As shown in FIG. 14, an apparatus 1400 for receiving sidelink information includes:

a transmitting unit 1401 configured to transmit first data information and/or a reference signal to a second device; wherein the second device scrambles and/or indicates feedback information for the first data information and/or the reference signal and/or second data information by using an identifier;

a receiving unit 1402 configured to receive the scrambled and/or indicated feedback information and/or second data information transmitted by the second device; and a processing unit 1403 configured to descramble and/or demodulate the feedback information and/or the second data information by using the identifier.

It should be noted that the components or modules related to this disclosure are only described above. However, this disclosure is not limited thereto, and the apparatuses 1300 and 1400 for transmitting sidelink information may further include other components or modules, and reference may be made to related techniques for particulars of these components or modules.

Furthermore, for the sake of simplicity, connection relationships between the components or modules or signal profiles thereof are only illustrated in FIG. 13 or 14. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the second device determines the priorities/the priority of the second data information and/or the feedback information, allocates power for the second data information and/or the feedback information according to the priority/priorities, and/or scrambles or indicates the second data information and/or the feedback information by using the identifiers. Hence, supporting multiple unicast sessions or groupcast sessions by the same device may be achieved. Furthermore, interferences to which the feedback information is subject may be reduced, and confusion of feedback information of multiple devices may be prevented.

Embodiment 8

The embodiments of this disclosure provide a communication system, and reference may be made to FIG. 1, with contents identical to those in embodiments 1-7 being not going to be described herein any further. In an embodiment, the communication system 100 may include:

a first device 102 configured to transmit first data information and/or a reference signal to a second device 103, and receive second data information and/or feedback information for the first data information and/or the reference signal transmitted by the second device 103; and the second device 103 configured to determine priorities/a priority of the second data information and/or the feedback information, and allocate power for the second data information and/or the feedback information according to the priorities/priority, and/or, scramble and/or indicate the feedback information and/or the second data information by using an identifier.

As shown in FIG. 1, the communication system 100 may further include:

a network device 101 configured to serve for the first device 102 and/or the second device 103.

The embodiment of this disclosure further provides a network device, which may be, for example, a base station. However, this disclosure is not limited thereto, and it may also be another network device.

Figure 15:
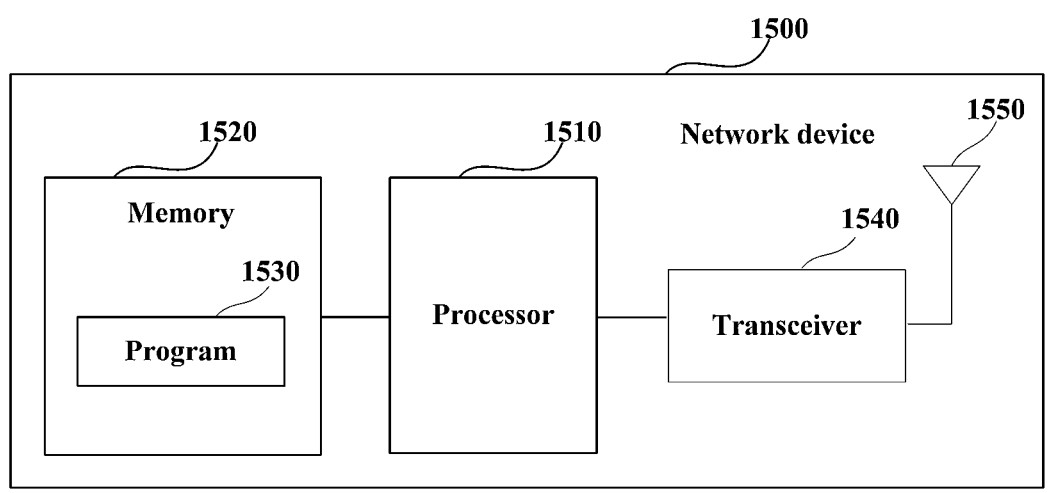
FIG. 15 is a schematic diagram of the network device of an embodiment of this disclosure.

FIG. 15 is a schematic diagram of a structure of the network device of the embodiment of this disclosure. As shown in FIG. 15, a network device 1500 may include a processor 1510 (such as a central processing unit (CPU)) and a memory 1520, the memory 1520 being coupled to the processor 1510. The memory 1520 may store various data, and furthermore, it may store a program 1530 for data processing, and execute the program 1530 under control of the processor 1510.

Furthermore, as shown in FIG. 15, the network device 1500 may include a transceiver 1540, and an antenna 1550, etc. Functions of the above components are similar to those in the relevant art, and shall not be described herein any further. It should be noted that the network device 1500 does not necessarily include all the parts shown in FIG. 15, and furthermore, the network device 1500 may include parts not shown in FIG. 15, and the relevant art may be referred to.

The embodiment of this disclosure further provides a terminal equipment, however, this disclosure is not limited thereto, and it may also be another equipment.

Figure 16:
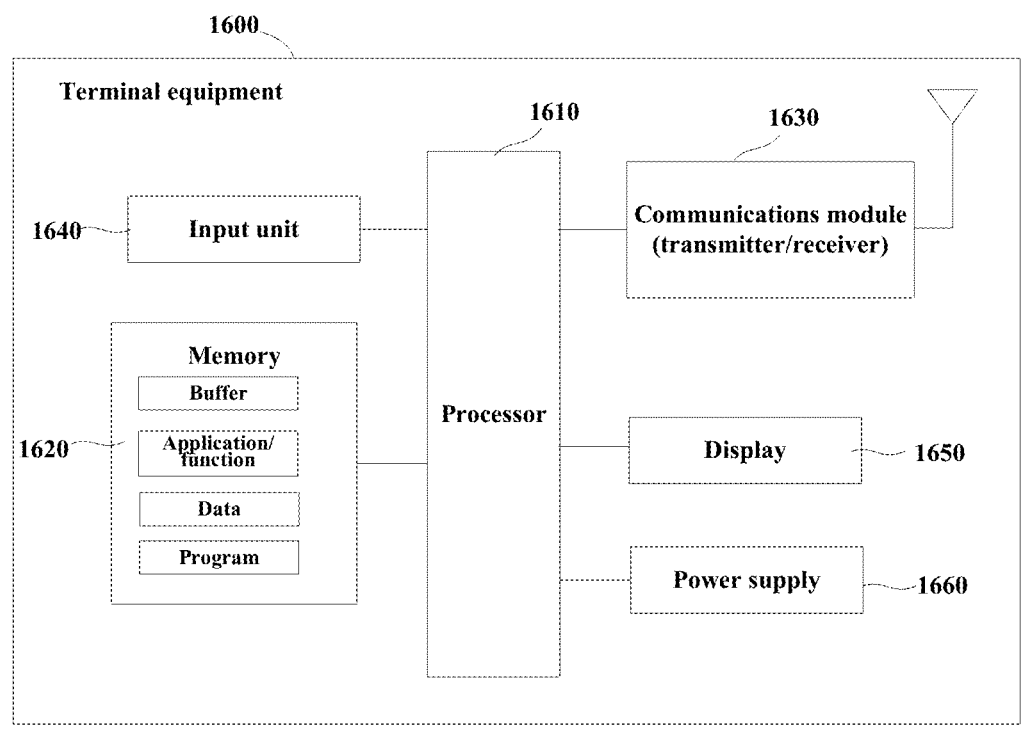
FIG. 16 is a schematic diagram of the terminal equipment of an embodiment of this disclosure.

FIG. 16 is a schematic diagram of the terminal equipment of the embodiment of this disclosure. As shown in FIG. 16, a terminal equipment 1600 may include a processor 1610 and a memory 1620, the memory 1620 storing data and a program and being coupled to the processor 1610. It should be noted that his figure is illustrative only, and other types of structures may also be used, so as to supplement or replace this structure and achieve a telecommunications function or other functions.

For example, the processor 1610 may be configured to execute a program to carry out the method for transmitting sidelink information as described in embodiment 1. For example, the processor 1610 may be configured to execute the following control: receiving first data information and/or a reference signal transmitted by at least one first device; determining priorities/a priority of second data information and/or feedback information for the first data information and/or the reference signal; allocating power for the second data information and/or the feedback information according to the priority/priorities; and transmitting to the at least one first device the second data information and/or the feedback information being allocated with power.

For another example, the processor 1610 may be configured to execute the program to carry out the method for transmitting sidelink information as described in Embodiment 2. For example, the processor 1610 may be configured to execute the following control: receiving first data information and/or a reference signal transmitted by at least one first device; scrambling and/or indicating feedback information for the first data information and/or reference signal and/or second data information by using an identifier; and transmitting to the at least one first device the scrambled and/or indicated feedback information and/or second data information.

For a further example, the processor 1610 may be configured to execute the program to carry out the method for receiving sidelink information as described in Embodiment 4. For example, the processor 1610 may be configured to execute the following control: transmitting first data information and/or a reference signal to a second device; wherein the second device determines priorities/a priority of second data information and/or feedback information for the first data information and/or the reference signal, and allocates power for the second data information and/or the feedback information according to the priority/priorities; and receiving the second data information and/or the feedback information allocated with power transmitted by the second device.

For still another example, the processor 1610 may be configured to execute the program to carry out the method for receiving sidelink information as described in Embodiment 5. For example, the processor 1610 may be configured to execute the following control: transmitting first data information and/or a reference signal to a second device; wherein the second device scrambles and/or indicates feedback information for the first data information and/or the reference signal and/or second data information by using an identifier; receiving the scrambled and/or indicated feedback information and/or second data information transmitted by the second device; and descrambling and/or demodulating the feedback information and/or the second data information by using the identifier.

As shown in FIG. 16, the terminal equipment 1600 may further include a communication module 1630, an input unit 1640, a display 1650, and a power supply 1660; functions of the above components are similar to those in the relevant art, which shall not be described herein any further. It should be noted that the terminal equipment 1600 does not necessarily include all the parts shown in FIG. 16, and the above components are not necessary. Furthermore, the terminal equipment 1600 may include parts not shown in FIG. 16, and the relevant art may be referred to.

An embodiment of this disclosure provides a computer program, which, when executed in a terminal equipment, will cause the terminal equipment to carry out the methods for transmitting sidelink information as described in embodiments 1-3 or the methods for receiving sidelink information as described in embodiments 4 and 5.

An embodiment of this disclosure provides a storage medium, including a computer program, which will cause a terminal equipment to carry out the methods for transmitting sidelink information as described in embodiments 1-3 or the methods for receiving sidelink information as described in embodiments 4 and 5.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

As to implementations containing the above embodiments, following supplements are further disclosed.

Supplement 1. A method for transmitting sidelink information, including:
receiving, by a second device, first data information and/or a reference signal transmitted by at least one first device;
determining priorities/a priority of second data information and/or feedback information for the first data information and/or the reference signal;
allocating power for the second data information and/or the feedback information according to the priority/priorities; and
transmitting to the at least one first device the second data information and/or the feedback information being allocated with power.

Supplement 2. The method according to supplement 1, wherein the feedback information includes at least one of the following: hybrid automatic repeat request acknowledgement information, channel state information, a modulation and coding scheme, a channel quality indicator, a precoding matrix indicator, a rank indicator, beam information, reference signal received power, reference signal received quality, a pathloss, a sounding reference signal resource indicator, a reference signal resource indicator, an interference condition, motion information.

Supplement 3. The method according to supplement 1 or 2, wherein the second data information and the feedback information are carried in a physical sidelink data channel or a physical sidelink feedback control channel; or the feedback information is carried in a physical sidelink control channel or a physical sidelink feedback control channel, and the second data information is carried in a physical sidelink data channel.

Supplement 4. The method according to supplement 3, wherein a symbol located before the physical sidelink control channel or the physical sidelink feedback control channel is used for guard interval and/or automatic gain control.

Supplement 5. The method according to any one of supplements 1-4, wherein the priorities/priority of the second data information and/or the feedback information is/are determined according to a service quality parameter.

Supplement 6. The method according to supplement 5, wherein the service quality parameter includes at least one of the following: a packet priority, latency, a reliability, a minimum needed communication distance, a packet reliability, a channel busy ratio, a channel occupancy ratio.

Supplement 7. The method according to any one of supplements 1-6, wherein the determining priorities/a priority of second data information and/or feedback information include at least one of the following:

determining the priority of the second data information according to a service quality parameter indicated by sidelink control information scheduling the second data information and/or a service quality parameter of the second data information notified by a higher layer;

determining a priority of hybrid automatic repeat request acknowledgement information for the first data information according to a service quality parameter indicated by sidelink control information scheduling the first data information and/or a service quality parameter of the first data information notified by a higher layer;

determining a priority of channel state information according to a predetermined threshold associated with the channel state information;

determining that a priority of feedback information containing only hybrid automatic repeat request acknowledgement information is higher than a priority of feedback information containing only channel state information;

determining that a priority of feedback information containing hybrid automatic repeat request acknowledgement information and channel state information is equal to a higher priority of the contained hybrid automatic repeat request acknowledgement information and channel state information;

determining that a priority of first information containing the second data information and hybrid automatic repeat request acknowledgement information is equal to a higher priority of the contained second data information and hybrid automatic repeat request acknowledgement information;

determining that a priority of second information containing the second data information and the channel state information is equal to a higher priority of the contained second data information and channel state information;

determining that a priority of third information containing the second data information, hybrid automatic repeat request acknowledgement information and the channel state information is equal to a highest priority of the contained second data information, hybrid automatic repeat request acknowledgement information and channel state information.

Supplement 8. The method according to any one of supplements 1-7, wherein the method further includes:

sorting priorities of the second data information and/or the feedback information.

Supplement 9. The method according to any one of supplements 1-8, wherein the allocating power for the second data information and/or the feedback information according to the priority/priorities includes at least one of the following:

allocating power only for the second data information and/or the feedback information having a highest priority;

preferential allocating power for the second data information and/or the feedback information having a higher priority in a descending order of priorities, and allocating power for the second data information and/or the feedback information having a lower priority when there is power remained;

not allocating power for the second data information and/or the feedback information or no transmission of the second data information and/or the feedback information when power allocated for the second data information and/or the feedback information is less than a minimum power required by power controlling.

Supplement 10. The method according to supplement 9, wherein the method includes at least one of the following:

for fourth information and first feedback information having identical priorities, preferential allocating power for the first feedback information, the fourth information containing the second data information, and the first feedback information at least containing hybrid automatic repeat request acknowledgement information; and wherein the priority of the fourth information is equal to the priority of the second data information, and the priority of the first feedback information is equal to a priority of the hybrid automatic repeat request acknowledgement information;

for second feedback information and third feedback information having identical priorities, preferential allocating power for the third feedback information, the second feedback information containing only hybrid automatic repeat request acknowledgement information, and the third feedback information containing hybrid automatic repeat request acknowledgement information and channel state information;

for the second data information and/or fourth feedback information located in a primary carrier and the second data information and/or fifth feedback information not located in a primary carrier having identical priorities, preferential allocating power for the second data information and/or fourth feedback information located in the primary carrier.

Supplement 11. The method according to any one of supplements 1-10, wherein the method further includes:

configuring a candidate resource set by the first device for the second device; and selecting one or more resources by the second device for transmitting the second data information and/or the feedback information.

Supplement 12. The method according to any one of supplements 1-11, wherein the method further includes:

selecting one or more transmission resources for the second data information and/or the feedback information according to the priorities/priority.

Supplement 13. The method according to supplement 12, wherein when a transmission resource of the second data information and/or the feedback information having a lower priority overlaps a transmission resource of the second data information and/or the feedback information having a higher priority, the second data information and/or the feedback information having a lower priority is not transmitted; or when a transmission resource of the second data information and/or the feedback information having a lower priority overlaps a transmission resource of the second data information and/or the feedback information having a higher priority, a transmission resource is reselected for the second data information and/or the feedback information having a lower priority.

Supplement 14. The method according to any one of supplements 1-13, wherein the method further includes:

scrambling and/or indicating the second data information and/or the feedback information by using an identifier.

Supplement 15. The method according to supplement 14, wherein the identifier includes at least one of the following: an identifier of the first device, an identifier of a second device, a session identifier, a sidelink identifier, a device group identifier.

Supplement 16. The method according to supplement 14 or 15, wherein the scrambling and/or indicating the feedback information and/or the second data information by using an identifier includes:

determining an initial value of a scrambling sequence generation function according to at least a part of the identifier;

generating a scrambling sequence by using the scrambling sequence generation function; and scrambling one or more bits and/or cyclic redundancy check of the feedback information and/or the second data information by using the scrambling sequence.

Supplement 17. The method according to supplement 14 or 15, wherein the scrambling and/or indicating the feedback information and/or the second data information by using an identifier includes:

determining, according to the identifier, determining at least one of a sequence, an orthogonal cover code, a root sequence and a cyclic shift used by the feedback information and/or the second data information.

Supplement 18. The method according to any one of supplements 14-17, wherein the indicating the feedback information and/or the second data information by using an identifier includes:

containing at least a part of the identifier in payloads/a payload of the feedback information and/or the second data information.

Supplement 19. The method according to any one of supplements 14-18, wherein the method further includes:

adding cyclic redundancy check into the feedback information using RM coding or channel coding of a small block length, and/or, adding cyclic redundancy check into the feedback information less than or equal to 2 bits.

Supplement 20. A method for transmitting sidelink information, including:

receiving, by a second device, first data information and/or a reference signal transmitted by at least one first device;

scrambling and/or indicating feedback information for the first data information and/or reference signal and/or second data information by using an identifier; and transmitting to the at least one first device the scrambled and/or indicated feedback information and/or second data information.

Supplement 21. The method according to supplement 20, wherein the identifier includes at least one of the following: an identifier of the first device, an identifier of a second device, a session identifier, a sidelink identifier, a device group identifier.

Supplement 22. The method according to supplement 20 or 21, wherein the scrambling feedback information and/or second data information by using an identifier includes:

determining an initial value of a scrambling sequence generation function according to at least a part of the identifier;

generating a scrambling sequence by using the scrambling sequence generation function; and scrambling one or more bits and/or cyclic redundancy check of the feedback information and/or the second data information by using the scrambling sequence.

Supplement 23. The method according to supplement 20 or 21, wherein the indicating feedback information and/or second data information by using an identifier includes:

according to the identifier, determining at least one of a sequence, an orthogonal cover code, a root sequence and a cyclic shift used by the feedback information and/or the second data information.

Supplement 24. The method according to any one of supplements 20-23, wherein the indicating feedback information and/or second data information by using an identifier includes:

containing at least a part of the identifier in payloads/a payload of the feedback information and/or the second data information.

Supplement 25. The method according to any one of supplements 20-24, wherein the method further includes:

configuring a candidate resource set by the first device for the second device; and selecting one or more resources from the candidate resource set by the second device for transmitting the second data information and/or the feedback information.

Supplement 26. The method according to any one of supplements 20-25, wherein the method further includes:

adjusting and/or selecting one or more transmission resources for the second data information and/or the feedback information according to the priority/priorities.

Supplement 27. The method according to supplement 26, wherein when a transmission resource of the second data information and/or the feedback information having a lower priority overlaps a transmission resource of the second data information and/or the feedback information having a higher priority, the second data information and/or the feedback information having a lower priority is not transmitted; or when a transmission resource of the second data information and/or the feedback information having a lower priority overlaps a transmission resource of the second data information and/or the feedback information having a higher priority, a transmission resource is reselected for the second data information and/or the feedback information having a lower priority.

Supplement 28. The method according to any one of supplements 20-27, wherein the method further includes:

adding cyclic redundancy check into the feedback information using RM coding or channel coding of a small block length, and/or, adding cyclic redundancy check into the feedback information less than or equal to 2 bits.

Supplement 29. A method for transmitting sidelink information, including:
receiving, by a second device, first data information and/or a reference signal transmitted by at least one first device; and transmitting second data information and/or feedback information for the first data information and/or the reference signal to the at least one first device;
wherein the second data information and the feedback information are carried in a physical sidelink data channel or a physical sidelink feedback control channel; or the feedback information is carried in a physical sidelink control channel or a physical sidelink feedback control channel, and the second data information is carried in a physical sidelink data channel;
and a symbol located before the physical sidelink control channel or the physical sidelink feedback control channel is used for guard interval and/or automatic gain control.

Supplement 30. A method for transmitting sidelink information, including:
receiving, by a second device, first data information and/or a reference signal transmitted by at least one first device;
selecting one or more resources from a set of candidate resources by the second device, the set of candidate resources being configured by the first device or a network device for the second device; and
transmitting second data information and/or feedback information for the first data information and/or the reference signal by the second device to the at least one first device.

Supplement 31. The method according to supplement 30, wherein the method further includes:
adjusting and/or selecting one or more transmission resources for the second data information and/or the feedback information according to one or more priorities.

Supplement 32. The method according to supplement 31, wherein when a transmission resource of the second data information and/or the feedback information having a lower priority overlaps a transmission resource of the second data information and/or the feedback information having a higher priority, the second data information and/or the feedback information having a lower priority is/are not transmitted; or
when a transmission resource of the second data information and/or the feedback information having a lower priority overlaps a transmission resource of the second data information and/or the feedback information having a higher priority, a transmission resource is reselected for the second data information and/or the feedback information having a lower priority.

Supplement 33. A method for transmitting sidelink information, including:
receiving, by a second device, first data information and/or a reference signal transmitted by at least one first device; and
transmitting second data information and/or feedback information for the first data information and/or the reference signal by the second device to the at least one first device;
wherein, cyclic redundancy check is added into the feedback information using RM coding or channel coding of a small block length, and/or, cyclic redundancy check is added into the feedback information less than or equal to 2 bits.

Supplement 34. A method for receiving sidelink information, including:
transmitting first data information and/or a reference signal by a first device to a second device; wherein the second device determines priorities/a priority of second data information and/or feedback information for the first data information and/or the reference signal, and allocates power for the second data information and/or the feedback information according to the priority/priorities; and
receiving, by the first device, the second data information and/or the feedback information allocated with power transmitted by the second device.

Supplement 35. The method according to supplement 34, wherein the method further includes:
descrambling and/or demodulating the second data information and/or the feedback information by the first device by using the identifier.

Supplement 36. A method for receiving sidelink information, including:
transmitting first data information and/or a reference signal by a first device to a second device; wherein the second device scrambles and/or indicates feedback information for the first data information and/or reference signal and/or second data information by using an identifier;
receiving by the first device the scrambled and/or indicated feedback information and/or the second data information transmitted by the second device; and
descrambling and/or demodulating the feedback information and/or the second data information by using the identifier.

Supplement 37. The method according to supplement 36, wherein the second device determines priorities/a priority of the second data information and/or the feedback information for the first data information and/or the reference signal, and allocates power for the second data information and/or the feedback information according to the priority/priorities.

Supplement 38. A method for receiving sidelink information, including:
transmitting first data information and/or a reference signal by a first device to a second device; and
receiving second data information and/or feedback information for the first data information and/or reference signal transmitted by the first device;
wherein the second data information and the feedback information are carried in a physical sidelink data channel or a physical sidelink feedback control channel; or the feedback information is carried in a physical sidelink control channel or a physical sidelink feedback control channel, and the second data information is carried in a physical sidelink data channel;
and a symbol located before the physical sidelink control channel or the physical sidelink feedback control channel is used for guard interval and/or automatic gain control.

Supplement 39. A method for receiving sidelink information, including:
configuring a candidate resource set by a first device for a second device;
transmitting first data information and/or a reference signal by the first device to the second device; and receiving second data information and/or feedback information for the first data information and/or reference signal transmitted by the second device.

Supplement 40. A method for receiving sidelink information, including:

transmitting first data information and/or a reference signal by a first device to a second device; and receiving second data information and/or feedback information for the first data information and/or reference signal transmitted by the first device;

wherein cyclic redundancy check is added into the feedback information using RM coding or channel coding of a small block length, and/or, cyclic redundancy check is added into the feedback information less than or equal to 2 bits.

Supplement 41. A terminal equipment, including a memory and a processor, the memory storing a computer program, and the processor being configured to execute the computer program to carry out the method for transmitting sidelink information as described in any one of supplements 1-33.

Supplement 42. A terminal equipment, including a memory and a processor, the memory storing a computer program, and the processor being configured to execute the computer program to carry out the method for receiving sidelink information as described in supplement 34 or 40.

What is claimed is:

1. An apparatus for transmitting sidelink information, configured in a second device, comprising:

a memory that stores a plurality of instructions; and processor circuitry coupled to the memory and configured to execute the instructions to:

receive first sidelink data information and/or a reference signal transmitted by at least one first device;

indicate sidelink feedback information for the first sidelink data information and/or reference signal by using an identifier; and transmit to the at least one first device the indicated sidelink feedback information, wherein the identifier comprises an identifier of the first device and an identifier of the second device, and wherein the processor circuitry is configured to, according to the identifier of the first device and the identifier of the second device, determine a cyclic shift used by the sidelink feedback information.

2. The apparatus according to claim 1, wherein the identifier further comprises at least one of the following: a session identifier, a sidelink identifier, a device group identifier.

3. The apparatus according to claim 1, wherein the processor circuitry is configured to contain at least a part of the identifier in payloads/a payload of the sidelink feedback information.

4. The apparatus according to claim 1, wherein the processor circuitry is further configured to add cyclic redundancy check into the sidelink feedback information using RM coding or channel coding of a small block length, and/or, add cyclic redundancy check into the sidelink feedback information less than or equal to 2 bits.

* * * * *